(12) United States Patent
Morita (10) Patent No.: US 11,370,408 B2
(45) Date of Patent: Jun. 28, 2022

(54) CONTROL APPARATUS

(71) Applicant: DENSO CORPORATION, Kariya (JP)

(72) Inventor: Yoshinori Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 512 days.

(21) Appl. No.: 16/366,096

(22) Filed: Mar. 27, 2019

(65) Prior Publication Data

US 2019/0299968 A1 Oct. 3, 2019

(30) Foreign Application Priority Data

Mar. 28, 2018 (JP) .............................. JP2018-063217

(51) Int. Cl.
| | |
|---|---|
| *B60L 9/00* | (2019.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B60W 20/00* | (2016.01) |
| *B60K 6/26* | (2007.10) |

(52) U.S. Cl.
CPC .............. *B60W 20/00* (2013.01); *B60K 6/26* (2013.01); *B60K 2006/268* (2013.01); *B60W 2510/244* (2013.01); *B60W 2555/60* (2020.02); *B60Y 2200/92* (2013.01); *B60Y 2300/192* (2013.01); *B60Y 2400/47* (2013.01)

(58) Field of Classification Search
CPC ............. B60W 20/00; B60W 2555/60; B60W 2510/244; B60K 6/26; B60K 2006/268; B60Y 2200/92; B60Y 2300/192; B60Y 2400/47

USPC .......................................................... 701/22
See application file for complete search history.

(56) References Cited

U.S. PATENT DOCUMENTS

| | | | |
|---|---|---|---|
| 2011/0205044 A1* | 8/2011 | Enomoto | B60L 7/12 |
| | | | 340/439 |
| 2011/0215764 A1* | 9/2011 | Takahashi | H02J 7/00 |
| | | | 320/134 |
| 2012/0153890 A1 | 6/2012 | Takahashi et al. | |

(Continued)

FOREIGN PATENT DOCUMENTS

| | | |
|---|---|---|
| JP | 2004-076599 A | 3/2004 |
| JP | 2012-090404 A | 5/2012 |

(Continued)

*Primary Examiner* — Mahmoud S Ismail
(74) *Attorney, Agent, or Firm* — Oliff PLC (57) ABSTRACT

A control apparatus is used with a vehicle including an engine, a storage battery, and an electrical load. The control apparatus works as an automatic engine stop and restart system and calculates a SOC lower limit that is a minimum value of state of charge (SOC) of the battery required to continue to stop the engine in an idle stop mode. The control apparatus also calculates an amount of electric power expected to be consumed by the electrical load during the idle stop mode and determines an idle stop enable SOC at which the idle stop mode is entered and which is selected to be the sum of the SOC lower limit and a SOC of the battery which at least compensates for the consumed amount of electric power. This ensures chances to stop the engine in the idle stop mode and improves fuel economy.

12 Claims, 6 Drawing Sheets

(56) References Cited

U.S. PATENT DOCUMENTS

| | | | | |
|---|---|---|---|---|
| 2014/0257636 A1* | 9/2014 | Ueki | ................... | B60W 10/30 |
| | | | | 701/36 |
| 2014/0371983 A1* | 12/2014 | Miyashita | ................ | H02J 7/00 |
| | | | | 701/36 |
| 2015/0345972 A1* | 12/2015 | Saito | .................... | G01C 21/36 |
| | | | | 701/521 |
| 2018/0233943 A1* | 8/2018 | Koizumi | ............... | H02J 7/0047 |
| 2020/0238971 A1* | 7/2020 | Hirata | .................. | B60W 10/08 |

FOREIGN PATENT DOCUMENTS

| | | | |
|---|---|---|---|
| JP | 2013-252765 | A | 12/2013 |
| JP | 2014-004928 | A | 1/2014 |
| JP | 2015-129494 | A | 7/2015 |
| JP | 5842927 | B2 | 1/2016 |
| JP | 2017-100472 | A | 6/2017 |

* cited by examiner

CONTROL APPARATUS

CROSS REFERENCE TO RELATED DOCUMENT

The present application claims the benefit of priority of Japanese Patent Application No. 2018-63217 filed on Mar. 28, 2018, the disclosure of which is incorporated herein by reference.

BACKGROUND

1 Technical Field

This disclosure relates generally to a control apparatus for use in a vehicle equipped with an internal combustion engine and a storage battery.

2 Background Art

An idle stop system for improving fuel economy is known which is designed to determine a target state-of-charge (SOC) of a storage battery (i.e., a target amount of electrical energy charged to the battery) in consideration of the amount of electric power consumed by an accessory, such as an air conditioner, in an idle stop mode in order to prevent the SOC of the battery from being decreased below a lower limit within a preset available SOC range while the electrical energy in the battery is consumed by the accessory in the idle stop mode.

The system, as taught in the above publication, does not consider the amount of electric power the battery is capable of delivering and thus frequently restarts the engine during the idle stop mode before the engine restart condition is satisfied, thereby resulting in insufficient improvement of the fuel economy.

SUMMARY

It is therefore an object of this disclosure to provide a control apparatus capable of improving fuel economy.

According to one aspect of the invention, there is provided a control apparatus which is used in a vehicle equipped with an internal combustion engine, a starter working to start the internal combustion engine, a chargeable and rechargeable storage battery, and an electrical load which is supplied with electric power from the storage battery. The control apparatus comprises: (a) a stop controller which stops the internal combustion engine in an idle stop mode when an automatic stop condition is met; (b) a start controller which controls an operation of the starter to restart the internal combustion engine when a restart condition is met during the idle stop mode; (c) a lower limit calculator which calculates a SOC lower limit using a state of the storage battery, the SOC lower limit being a state of charge of the storage battery required to continue to stop the internal combustion engine in the idle stop mode; (d) a consumed power calculator which calculates a consumed amount of electric power that is an amount of electric power expected to be consumed by the electrical load during a stop of the internal combustion engine in the idle stop mode; and (e) a SOC determiner which determines an idle stop enable SOC that is a state of charge of the storage battery that permits the idle stop mode to be entered to stop the internal combustion engine. The idle stop enable SOC is selected to be sum of the SOC lower limit, as derived by the lower limit calculator, and a SOC of the storage battery which at least compensates for the consumed amount of electric power calculated by the consumed power calculator.

The idle stop enable SOC which permits the idle stop mode to be entered to stop the internal combustion engine is, as described above, set to the sum of the SOC lower limit and the SOC at least compensating for an amount of electric power expected to be consumed by the electrical load during a stop of the internal combustion engine in the idle stop mode. Therefore, when the idle stop mode is entered when the SOC of the lithium-ion battery is higher than or equal to the idle stop enable SOC, it minimizes a risk that the SOC decreases below the SOC lower limit during the stop of the engine in the idle stop mode.

The SOC lower limit is, as described above, set to a minimum SOC of the storage battery which is required to continue to stop the internal combustion engine in the idle stop mode and determined depending upon the state of the storage battery (e.g., the temperature or state of deterioration, or output ability of the storage battery). This ensures an amount of electric power required to continue the idle stop mode as long as the SOC of the storage battery is higher than the SOC lower limit regardless of a change in state of the storage battery.

Consequently, the control apparatus serves to minimize a risk that the SOC in the storage battery decreases below the SOC lower limit during the idle stop mode before the restart condition is met, thereby causing the internal combustion engine to be restarted undesirably or resulting in a failure in restarting the internal combustion engine. This enables a period of time for which the internal combustion engine is kept stopped in the idle stop mode to be increased, thereby improving the fuel economy.

The SOC lower limit may be calculated as a function of a minimum value of state of charge of the storage battery required to restart the internal combustion engine. The SOC lower limit may alternatively be determined based on a minimum value of state of charge of the storage battery required to output an amount of electric power which ensures stability in operation of the electrical load during stop of the internal combustion engine in the idle stop mode.

Therefore, as long as the state of charge of the storage battery is higher than the SOC lower limit, the storage battery is capable of delivering an amount of electric power required to restart the internal combustion engine or ensure the stability in operation of the electrical load during the stop of the internal combustion engine in the idle stop mode.

The vehicle may be equipped with an electrical generator which generates electric power using drive energy transmitted from the internal combustion engine or kinetic energy of the vehicle. The storage battery is chargeable using the electric power delivered from the electrical generator. The control apparatus also includes a power generation controller which controls an operation of the electrical generator to bring a state of charge of the storage battery to be higher than or equal to a target state of charge. The target state of charge is selected to be higher than the idle stop enable SOC.

The control apparatus is, therefore, capable of securing an amount of electric power expected to be consumed by the electrical load during a subsequent stop of the internal combustion engine in the idle stop mode before the automatic stop condition is met.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Prior to describing an embodiment, a prior art will be referred to below.

For example, Japanese Patent No. 5842927 teaches an idle stop system for improving fuel economy which is designed to determine a target state-of-charge (SOC) of a storage battery (i.e., a target amount of electrical energy charged to the battery) in consideration of the amount of electric power consumed by an accessory, such as an air conditioner, in an idle stop mode in order to prevent the SOC of the battery from being decreased below a lower limit within a preset available SOC range while the electrical energy in the battery is consumed by the accessory in the idle stop mode.

The above idle stop system is, therefore, capable of preventing the SOC of the battery from reaching the lower limit to initiate a restart of an engine during the idle stop mode, that is, before an engine restart condition is met, thereby increasing the length of time the engine is in the idle stop mode to improve the fuel economy. The engine restart condition is, for example, a condition where a brake is released or an accelerator is actuated.

An amount of electric power the battery is capable of outputting depends upon aging or temperature of the battery as well as the SOC. This leads to a risk that the idle stop mode should not be continued even when the SOC of the battery is in the available SOC range, for example, because the battery is incapable of delivering power to start the engine or ensure the stability in operation of an electrical load connecting with the battery. For instance, when the battery is at low temperatures, so that the battery is incapable of delivering voltage required to restart the engine, the idle stop mode should not be continued even when the SOC of the battery is in the available SOC range.

In order to avoid such a risk that the amount of electric power outputted from the battery is insufficient to restart the engine, it is required to restart the engine in light of an amount of power the battery is capable of outputting even when the SOC of the battery is in the available SOC range. The system, as taught in the above publication, does not consider the amount of electric power the battery is capable of delivering and thus frequently restarts the engine during the idle stop mode before the engine restart condition is satisfied, thereby resulting in insufficient improvement of the fuel economy.

A control apparatus according to an embodiment is used in a vehicle equipped with an internal combustion engine, a starter working to start the internal combustion engine, a chargeable and rechargeable storage battery, and an electrical load which is supplied with electric power from the storage battery. The control apparatus comprises: (a) a stop controller which stops the internal combustion engine in an idle stop mode when an automatic stop condition is met; (b) a start controller which controls an operation of the starter to restart the internal combustion engine when a restart condition is met during the idle stop mode; (c) a lower limit calculator which calculates a SOC lower limit using a state of the storage battery, the SOC lower limit being a state of charge of the storage battery required to continue to stop the internal combustion engine in the idle stop mode; (d) a consumed power calculator which calculates a consumed amount of electric power that is an amount of electric power expected to be consumed by the electrical load during a stop of the internal combustion engine in the idle stop mode; and (e) a SOC determiner which determines an idle stop enable SOC that is a state of charge of the storage battery that permits the idle stop mode to be entered to stop the internal combustion engine. The idle stop enable SOC is selected to be sum of the SOC lower limit, as derived by the lower limit calculator, and a SOC of the storage battery which at least compensates for the consumed amount of electric power calculated by the consumed power calculator.

The idle stop enable SOC which permits the idle stop mode to be entered to stop the internal combustion engine is, as described above, set to the sum of the SOC lower limit and the SOC at least compensating for an amount of electric power expected to be consumed by the electrical load during a stop of the internal combustion engine in the idle stop mode. Therefore, when the idle stop mode is entered when the SOC of the lithium-ion battery is higher than or equal to the idle stop enable SOC, it minimizes a risk that the SOC decreases below the SOC lower limit during the stop of the engine in the idle stop mode.

The SOC lower limit is, as described above, set to a minimum SOC of the storage battery which is required to continue to stop the internal combustion engine in the idle stop mode and determined depending upon the state of the storage battery (e.g., the temperature or state of deterioration, or output ability of the storage battery). This ensures an amount of electric power required to continue the idle stop mode as long as the SOC of the storage battery is higher than the SOC lower limit regardless of a change in state of the storage battery.

Consequently, the control apparatus serves to minimize a risk that the SOC in the storage battery decreases below the SOC lower limit during the idle stop mode before the restart condition is met, thereby causing the internal combustion engine to be restarted undesirably or resulting in a failure in restarting the internal combustion engine. This enables a period of time for which the internal combustion engine is kept stopped in the idle stop mode to be increased, thereby improving the fuel economy.

The SOC lower limit may be calculated as a function of a minimum value of state of charge of the storage battery required to restart the internal combustion engine. The SOC lower limit may alternatively be determined based on a minimum value of state of charge of the storage battery required to output an amount of electric power which ensures stability in operation of the electrical load during stop of the internal combustion engine in the idle stop mode.

Therefore, as long as the state of charge of the storage battery is higher than the SOC lower limit, the storage battery is capable of delivering an amount of electric power required to restart the internal combustion engine or ensure the stability in operation of the electrical load during the stop of the internal combustion engine in the idle stop mode.

The vehicle may be equipped with an electrical generator which generates electric power using drive energy transmitted from the internal combustion engine or kinetic energy of the vehicle. The storage battery is chargeable using the electric power delivered from the electrical generator. The control apparatus also includes a power generation controller which controls an operation of the electrical generator to bring a state of charge of the storage battery to be higher than or equal to a target state of charge. The target state of charge is selected to be higher than the idle stop enable SOC.

The control apparatus is, therefore, capable of securing an amount of electric power expected to be consumed by the electrical load during a subsequent stop of the internal combustion engine in the idle stop mode before the automatic stop condition is met. The control apparatus in this embodiment is implemented by an engine electronic control unit (ECU) for use with an in-vehicle power supply system working to deliver electric power to various devices mounted in a vehicle powered by an internal combustion engine. The same or similar reference numbers used throughout the drawings refer to the same or similar parts, and repeated explanation thereof will be omitted.

Figure 1:
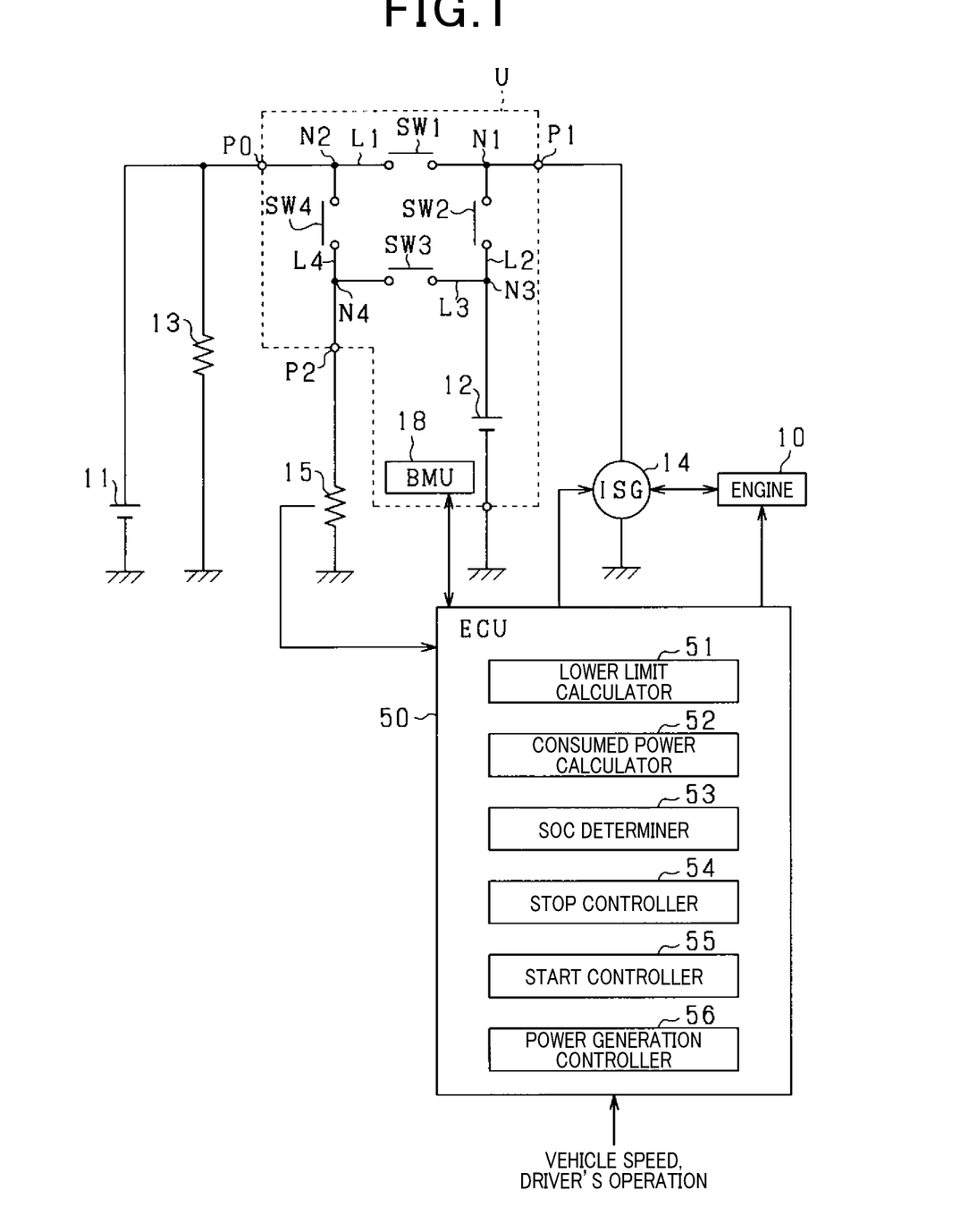
FIG. 1 is a schematic view which illustrates an in-vehicle power supply system according to an embodiment.

The in-vehicle power supply system is, as illustrated in FIG. 1, designed as a dual power supply system equipped with the lead-acid storage battery 11 and the lithium-ion battery 12 which deliver electric power to the electrical loads 13 and 15. The in-vehicle power supply system also works to deliver the power from each of the storage batteries 11 and 12 or charge each of the storage batteries 11 and 12 using the rotating electrical machine 14. The lead-acid storage battery 11 and the lithium-ion battery 12 are connected to the rotating electrical machine 14 in parallel to each other. The lead-acid storage battery 11 and the lithium-ion battery 12 are also connected to the electrical load 15 in parallel to each other.

The lead-acid storage battery 11 is a typical general-purpose storage battery, while the lithium-ion battery 12 is made of a high density energy storage battery which is lower in power loss than the lead-acid storage battery 11 in a charge or discharge operation, that is, higher in power density than the lead-acid storage battery 11. It is advisable that the lithium-ion battery 12 be higher in energy efficiency than the lead-acid storage battery 11 in the charge or discharge operation. The lithium-ion battery 12 is engineered as an assembled battery made up of a plurality of electrical cells. The batteries 11 and 12 are identical in rated voltage (e.g., 12V) with each other.

Although not explained in detail using drawings, the lithium-ion battery 12 is assembled with a substrate as the battery unit U and disposed in a housing. The battery unit U is indicated by a broken line in FIG. 1. The battery unit U has the external terminals P0, P1, and P2. The lead-acid storage battery 11 and the electrical load 13 are connected to the external terminal P. The rotating electrical machine 14 is connected to the external terminal P1. The electrical load 15 is connected to the external terminal P2.

The rotating electrical machine 14 is engineered as an ISG (Integrated Starter Generator) that is an electrical generator, such as a three-phase electrical motor or a power converter, which is capable of selectively operating in a motor mode and equipped with an inverter. The rotating electrical machine 14 is mechanically coupled with the engine 10. The rotating electrical machine 14 is capable of selectively operating in a fuel-powered electrical generator mode in which electricity is generated by drive energy transmitted from an output shaft of the engine 10 and in a regenerative power generation mode (e.g., a regenerative braking mode) in which electricity is generated by rotational energy (i.e., kinetic energy) of an axle of the vehicle. The rotating electrical machine 14, thus, works to deliver generated power to the batteries 11 and 12 and the electrical load 15. The rotating electrical machine 14 also works as a motor mode to apply torque to the output shaft of the engine 10. The rotating electrical machine 14 is supplied with electric power from the lithium-ion battery 12 to execute the motor mode.

For instance, when the engine 10 is at rest, and it is required to start the engine 10, the rotating electrical machine 14 works to provide torque to the output shaft of the engine 10 to start the engine 10. In other words, the rotating electrical machine 14 serves as an engine starter. The rotating electrical machine 14 also works in a torque assist mode to apply torque to the axel of the vehicle or the output shaft of the engine 10 to assist in driving the vehicle.

The electrical load 15 includes a constant-voltage requiring electrical device which requires voltage to be supplied thereto at a constant level or permits the supplied voltage to vary only within a given range. The electrical load 15 is, therefore, an electrical load which is needed to be electrically guarded and can not tolerate a malfunction of an electric power supply.

As an example of the constant-voltage requiring electrical device, the electrical load 15 is implemented by a navigational device, an audio device, a meter, or an ECU including the engine ECU 50. Unwanted resetting of such an electrical load is avoided by decreasing a variation in voltage of power supplied to such an electrical load, thereby ensuring the stability in operation of the electrical load. The electrical load 15 may also include a vehicle driving actuator, such as an electric power steering device or a braking device. The electrical load 13 is a typical electrical device other than the constant-voltage requiring electrical device. For instance, the electrical load 13 is implemented by a seat heater, a heater for a rear window defroster, a headlamp, a font windshield wiper, or an electric fan of an air conditioner.

The battery unit U will be discussed below. The battery unit U has disposed therein the electrical path L1 which connects between the external terminals P0 and P1 and the electrical path L2 which connects the junction N1 on the electrical path L1 and the lithium-ion battery 12 together. The electrical path L1 has the switch SW1 disposed thereon. The electrical path L2 has the switch SW2 disposed thereon. The electric power generated by the rotating electrical machine 14 is delivered to the lead-acid storage battery 11 or the lithium-ion battery 12 through the electrical path L1 or L2.

Specifically, the switch SW1 is arranged on an electrical path extending from the lead-acid storage battery 11 and the lithium-ion battery 12 and located closer the lead-acid storage battery 11 (i.e., the external terminal P0) than the junction N1 is. The switch SW2 is also disposed on the electrical path extending from the lead-acid storage battery 11 and the lithium-ion battery 12 and located closer to the lithium-ion battery 12 than the junction N1 is.

The battery unit U also has disposed therein the electrical path L4 connecting between the junction N2 on the electrical path L1 (i.e., a junction arranged between the external terminal P0 and the switch SW1) and the external terminal P2. The electrical path L4 is a path through which electric power is delivered from the lead-acid storage battery 11 to the electrical load 15. The electrical path L4 has the switch SW4 disposed between the junction N2 and the junction N4.

The battery unit U has also disposed therein the electrical path L3 which connects between the junction N3 on the electrical path L2 (i.e., a junction arranged between the switch SW2 and the lithium-ion battery 12) and the junction N4 on the electrical path L4 (i.e., a junction arranged between the switch SW4 and the external terminal P2). The electrical path L3 defines a path through which electric power is delivered from the lithium-ion battery 12 to the electrical load 15. The electrical path L3 has the switch SW3 disposed between the junction N3 and the junction N4. Specifically, the switch SW4 is arranged on an electrical path extending from the lead-acid storage battery 11 to the lithium-ion battery 12 and located closer to the lead-acid storage battery 11 than the junction N4 is. The switch SW3 is arranged on the electrical path extending from the lead-acid storage battery 11 to the lithium-ion battery 12 and located closer to the lithium-ion battery 12 than the junction N4 is.

The battery unit U is equipped with the BMU (Battery Management Unit) 18 which works to control operations of the switches SW1 to SW4. The BMU 18 is implemented by a microcomputer including a CPU, a ROM, a RAM, and an input/output interface. The BMU 18 controls on/off operations of the switches SW1 to SW4.

The BMU 18 monitors condition(s) of the lithium-ion battery 12 and outputs information about such conditions in the form of electrical signals. For instance, the conditions of the lithium-ion battery 12 include the temperature and the state of deterioration of the lithium-ion battery 12, an output voltage from the lithium-ion battery 12, and the SOC of the lithium-ion battery 12.

Specifically, the BMU 18 measures or calculates the SOC of the lithium-ion battery 12 (i.e., electrical energy remaining in the lithium-ion battery 12) and outputs information on the SOC in the form of an electrical signal. The calculation of the SOC may be achieved in a known way as a function of, for example, an OCV (Open Circuit Voltage) at the lithium-ion battery 12 when the current does not flow into or from the lithium-ion battery 12. The SOC may be updated by cyclically summing an amount of electrical current flowing into or from the lithium-ion battery 12 in the charge or discharge operation. In the following discussion, the SOC of the lithium-ion battery 12 will be merely referred to below as a SOC.

The BMU 18 also monitors the state of deterioration of the lithium-ion battery 12 and outputs information thereabout in the form of an electrical signal. The monitoring of the deterioration of the lithium-ion battery 12 may be achieved in a known way by calculating an internal resistance of the lithium-ion battery 12 using a combination of a terminal-to-terminal voltage at the lithium-ion battery 12 and a charge or discharge current in the lithium-ion battery 12 and calculating the state of the deterioration as a function of the internal resistance.

The BMU 18 acquires the temperature of the lithium-ion battery 12 from a temperature sensor (not shown) which measures the temperature of the lithium-ion battery 12 and outputs information thereabout in the form of an electrical signal. The BMU 18 also acquires an output voltage at the lithium-ion battery 12 from a voltage sensor (not shown) which measures the output voltage at the lithium-ion battery 12 and outputs information thereabout in the form of an electrical signal.

The engine ECU 50 (which will also be merely referred to as the ECU 50) is implemented by a known microcomputer including a CPU, a ROM, a RAM, and a flash memory. The ECU 50 obtains various types of information. The ECU 50 acquires information about driver's operations, for example, an output from an accelerator position sensor indicating a position of an accelerator and an output from a brake position sensor indicating a position of a brake pedal. The ECU 50 also acquires the information about the state of the lithium-ion battery 12 from the BMU 18. The ECU 50 also acquires information about the condition of the vehicle, for example, the speed of the vehicle from a vehicle speed sensor. The ECU 50 also acquires information about the state of operation of the electrical load 15 from the electrical load 15.

The ECU 50 analyzes the acquired information to execute various control tasks. For example, the ECU 50 control a motor operation or an electricity-generating operation of the rotating electrical machine 14 using information about the speed of the vehicle or the driver's operation. Simultaneously, the ECU 50 controls the charge or discharge operation of the lithium-ion battery 12 as a function of the SOC of the lithium-ion battery 12.

Specifically, the ECU 50 instructs the BMU 18 of the battery unit U to bring the SOC of the lithium-ion battery 12 to within a given available range defined by a flat section (also called a plateau region) of a charge/discharge curve where a variation in voltage is small. The BMU 18 controls the operations of the switches SW1 to SW4 according to the instruction from the ECU 50 to control the charge or discharge operation of the lithium-ion battery 12.

The ECU 50 also controls operations of the engine 10 including a start and a stop operation of the engine 10. For instance, the ECU 50 executes an idle stop mode of the engine 10. The idle stop mode is to stop the engine 10 from operating (i.e., combustion of fuel in the engine 10) when given automatic stop conditions are met and then restart the engine 10 when given restart conditions are met. The automatic stop conditions include a condition where the speed of the vehicle is in an automatic stop range (e.g., 10 km/h or less), and the accelerator operation has been stopped or the brake operation has been performed. The restart conditions include a condition where the accelerator operation has been started or the brake operation has been stopped. The ECU 50 also determines whether the engine 10 has been fired up after being started, that is, whether the restart operation of the engine 10 has been completed. The engine control operation and the idle stop operation may alternatively be executed using separate ECUs, respectively.

The SOC of the lithium-ion battery 12 continues to be decreased during the idle stop mode because it is required to continue to supply electric power to the electrical load 15 that is the constant-voltage requiring electrical device. Conventional control systems are, therefore, designed to calculate the amount of electric power which is expected to be consumed by an electrical load in the idle stop mode and use the calculated amount of electric power to determine a threshold value that is a minimum value of the SOC which is needed before the idle stop mode is entered.

Specifically, the conventional control systems adds the calculated amount of electric power expected to be consumed by the electrical device to a lower limit of an available SOC range of a lithium-ion battery to determine it as the threshold value. The conventional control systems work to control the charge or discharge operation of the lithium-ion battery to keep the SOC of the lithium-ion battery above the threshold value, thereby eliminating a risk that the engine is restarted before the restart conditions are met when the SOC reaches the lower limit due to consumption of electric power by the electrical device during the idle stop mode.

The output power from the lithium-ion battery 12, as described already, depends upon conditions associated with output performance of the lithium-ion battery, such as the state of deterioration or the temperature of the lithium-ion battery 12. For instance, when the lithium-ion battery 12 is deteriorated or at a high or a low temperature, it may result in an undesirable decrease in output voltage from the lithium-ion battery 12 regardless of the SOC.

Therefore, if the threshold value is determined using the lower limit of the available SOC range of the lithium-ion battery 12, for example, in an initial state thereof, the following drawback is encountered. When the state of the lithium-ion battery 12, such as the state of deterioration or temperature of the lithium-ion battery 12, is changed, it may lead to a risk that the lithium-ion battery 12 is incapable of delivering the amount of electric power required to continue the idle stop mode.

In order to alleviate the above problem, the ECU 50 in this embodiment executes the charge or discharge operation of the lithium-ion battery 12 and the idle stop mode in consideration of the state of the lithium-ion battery 12 in the following way described below in detail.

The ECU 50 is equipped with various types of functions described below. Specifically, the ECU 50 is, as illustrated in FIG. 1, equipped with the lower limit calculator 51, the consumed power calculator 52, the SOC determiner 53, the stop controller 54, the start controller 55, and the power generation controller 56. These functions are achieved by performing control programs stored in the ROM of the ECU 50, but however, may alternatively be achieved in hardware, such as an electronic circuit, or at least partially achieved in software, such as a computer.

The lower limit calculator 51 works to calculate or determine a SOC lower limit that is a minimum value of the SOC of the lithium-ion battery 12 required to restart the engine 10 as a function of the state of the lithium-ion battery 12. In other words, the SOC lower limit is the value of the SOC of the lithium-ion battery 12 determined to be required at least to continue to stop the engine 10 in the idle stop mode. Specifically, the SOC lower limit is determined by the higher of two: a minimum value of the SOC required for the lithium-ion battery 12 to deliver an amount of electric power to the rotating electrical machine 14 to output torque to start the engine 10 and a minimum value of the SOC required for the lithium-ion battery 12 to deliver an amount of electric power needed to ensure the stable operation of the electrical load 15 in the idle stop mode.

Specifically, mapped data used to determine the SOC lower limit as a function of parameters indicating the state of deterioration and temperature of the lithium-ion battery 12 is prepared in advance and stored in the ECU 50. The lower limit calculator 51 calculates the SOC lower limit as a function of the state of deterioration and temperature of the lithium-ion battery 12, as derived by the BMU 18, by look-up using the mapped data.

The consumed power calculator 52 estimates or calculates an amount of electric power consumed by the electrical load 15 while the engine 10 is stopped in the idle stop mode. The consumed amount of electric power, as referred to herein, is an amount of electric power consumed by the electrical load 15 until a given period of time passes after the engine 10 is stopped in the idle stop mode. The given period of time is preferably selected as a constant period of time (e.g., 1 to 2 minutes) for which the engine 10 is highly likely to be stopped in the idle stop mode, but may alternatively be determined using a travel history of the vehicle or information about surroundings of the vehicle, as will be described later in detail.

The consumed amount of electric power is calculated based on the state of operation of the electrical load 15 using mapped data. The state of operation of the electrical load 15, as referred to herein, includes an amount of electric power required by the electrical load 15 as well as an on- or off-state of the electrical load 15. The state of operation is outputted form the electrical load 15. When the electrical load 15 whose required amount of electric power is relatively high is in the on-state, the amount of electric power required by the electrical load 15 placed in the on-state is high, or a plurality of electrical loads 15 are simultaneously in the on-state, the consumed amount of electric power is determined to be large using the mapped data. Alternatively, when the electrical load 15 whose required amount of electric power is relatively high is in the off-state, the amount of electric power required by the electrical load 15 placed in the on-state is low, or a plurality of electrical loads 15 are simultaneously in the off-state, the consumed amount of electric power is determined to be small using the mapped data.

The SOC determiner 53 works to determine an idle stop enable SOC as a function of the consumed amount of electric power, as calculated by the consumed power calculator 52, based on the SOC lower limit calculated by the lower limit calculator 51. The idle stop enable SOC is a SOC of the lithium-ion battery 12 which permits the idle stop mode to be entered to stop the engine 10 when the automatic stop conditions are met. In other words, when the idle stop enabler SOC is reached and the automatic stop conditions are satisfied, the idle stop mode is entered to stop the engine 10. Specifically, the SOC determiner 53 adds an amount of electric power, as required to be stored in the lithium-ion battery 12 at least to compensate for the consumed amount of electric power calculated by the consumed power calculator 52, to the SOC lower limit and determines such sum as the idle stop enable SOC.

The stop controller 54 works to stop the engine 10 in the idle stop mode when a measured value of the SOC of the lithium-ion battery 12 is higher than or equal to the idle stop enable SOC, and the automatic stop conditions are met. The determination of whether the automatic stop conditions are satisfied or not is, as described above, achieved using information about the speed of the vehicle and diver's operation.

The start controller 55 works to control the operation of the rotating electrical machine 14 to restart the engine 10 when the restart conditions are met in the idle stop mode. The determination of whether the restart conditions are met or not is, as described above, achieved using the driver's operation. The start controller 55 also works to actuate the rotating electrical machine 14 in the motor mode to restart the engine 10 when the restart conditions are not yet met in the idle stop mode, but the SOC of the lithium-ion battery 12 has dropped to the SOC lower limit. This eliminates a risk of failure in restarting the engine 10 or instability in operation of the electrical load 15 due to an insufficient amount of electric power in the lithium-ion battery 12.

The power generation controller 56 works to control electrical generation of the rotating electrical machine 14 to increase the SOC to be higher than or equal to a target SOC. When the SOC is lower than an upper limit of the available SOC range, and it is possible to achieve the regenerative power generation using kinetic energy of the vehicle, for example, during deceleration of the vehicle, the power generation controller 56 rotates the rotating shaft of the rotating electrical machine 14 using the kinetic energy of the vehicle to make the rotating electrical machine 14 generate electricity in the regenerative power generation mode.

When the SOC of the lithium-ion battery 12 is lower than the target SOC, and it is impossible to achieve the regenerative power generation using kinetic energy of the vehicle, for example, when the vehicle is being stopped, the power generation controller 56 drives the engine 10 and rotates the rotating shaft of the rotating electrical machine 14 using torque produced by the output shaft of the engine 10 to make the rotating electrical machine 14 generate electricity in the power generation mode (i.e., the fuel-powered electrical generator mode).

The target SOC is selected to be at least higher than the idle stop enable SOC. In other words, the target SOC is determined to be the idle stop enable SOC plus a given margin. Specifically, the SOC determine 53 multiplies the idle stop enable SOC by a given value (e.g., 1.2) and determines it as the target SOC. Since the idle stop enable SOC is determined using the SOC lower limit and the consumed amount of electric power, the target SOC is viewed as being determined using the SOC lower limit and the consumed amount of electric power.

The SOC determiner 53 may add a given amount of electric power to the idle stop enable SOC and determine it as the target SOC. For example, the given amount of electric power is preferably set to be a SOC large enough to keep the engine 10 stopped in the idle stop mode for several minutes. The target SOC may alternatively be stored in a memory as a fixed value without being calculated by the SOC determiner 53. The fixed value may be determined to be greater than a maximum SOC selected as the idle stop enable SOC.

The ECU 50 also permits the rotating electrical machine 14 to work in the torque assist mode when the SOC of the lithium-ion battery 12 is greater than the target SOC. Specifically, when determining that the vehicle is accelerating or traveling at a constant speed using the driver's operation and the speed of the vehicle, and when the SOC of the lithium-ion battery 12 is higher than the target SOC, the ECU 50 actuates the rotating electrical machine 14 in the motor mode to assist in driving the vehicle.

An idle stop operation executed by the ECU 50 according to a sequence of logical steps or program in FIG. 2 will be described below. The idle stop operation is initiated upon turning on of an ignition switch of the vehicle and then performed cyclically by the ECU 50.

Figure 2:
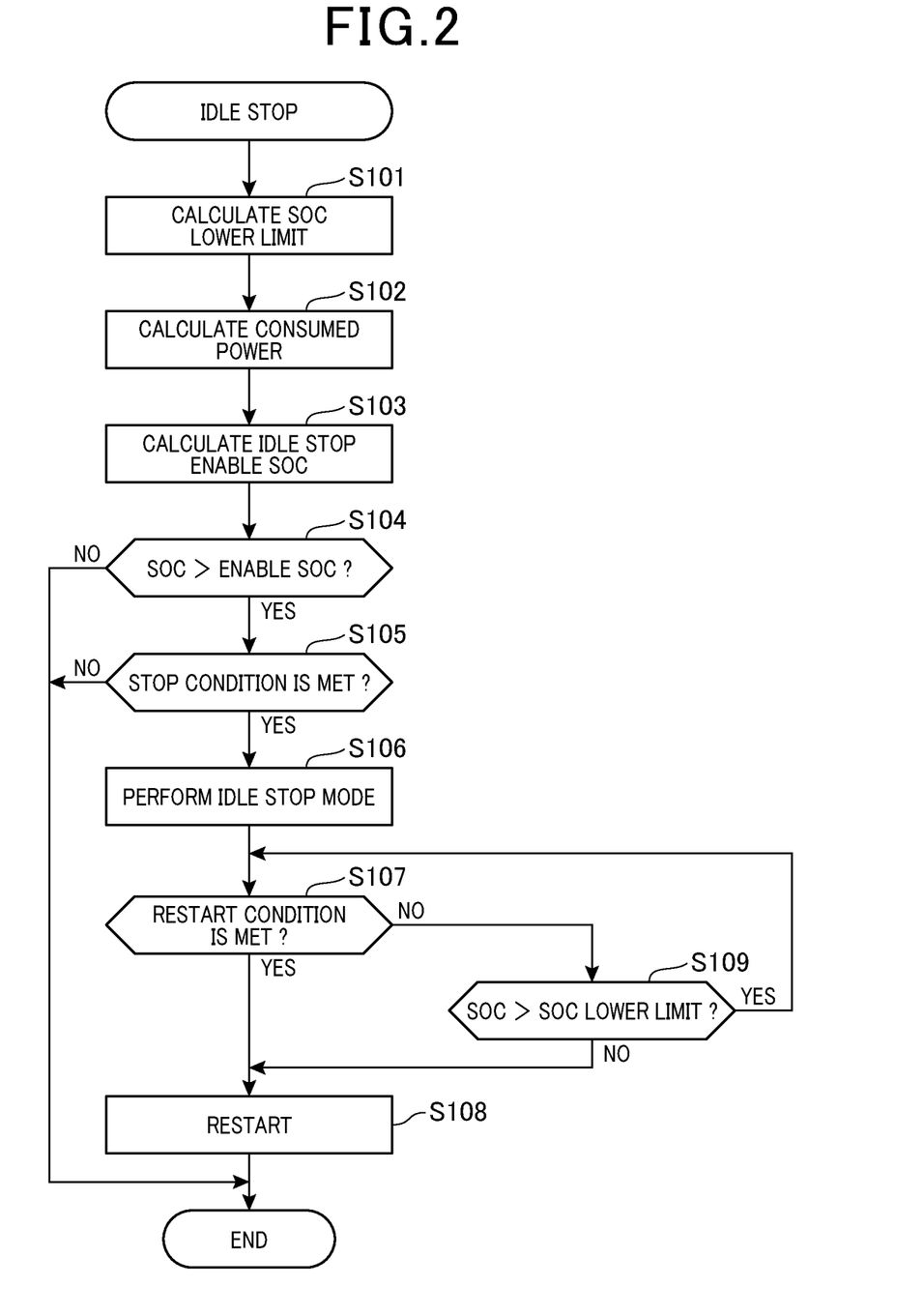
FIG. 2 is a flowchart of an idle stop operation program executed by a control apparatus according to an embodiment.

After entering the program in FIG. 2, the routine proceeds to step S101 wherein the ECU 50 (i.e., the lower limit calculator 51) estimates the SOC lower limit as a function of the state of deterioration and temperature of the lithium-ion battery 12, as derived from the BMU 18, by look-up using the mapped data. The routine proceeds to step S102 wherein the ECU 50 (i.e., the consumed power calculator 52) calculates an amount of electric power expected to be consumed by the electrical load 15 while the vehicle is being stopped in the idle stop mode using the state of operation of the electrical load 15.

The routine proceeds to step S103 wherein the ECU 50 (i.e., the SOC determiner 53) determines the idle stop enable SOC in consideration of the consumed amount of electric power, as calculated in step S102, based on the SOC lower limit determined in step S101. The routine proceeds to step S104 wherein the ECU 50 determines whether the SOC of the lithium-ion battery 12 is higher than the idle stop enable SOC. If a NO answer is obtained, then the routine terminates the idle stop operation.

Alternatively, if a YES answer is obtained in step S104 meaning that the SOC of the lithium-ion battery 12 is higher than the idle stop enable SOC, then the routine proceeds to step S105 wherein the ECU 50 determines whether the automatic stop conditions are met or not using obtained information about the speed of the vehicle and the driver's operation. If a NO answer is obtained, then the routine terminates the idle stop operation.

Alternatively, if a YES answer is obtained in step S105 meaning that the automatic stop conditions are met, then the routine proceeds to step S106 wherein the ECU 50 (i.e., the stop controller 54) stops the engine 10 in the idle stop mode.

Subsequently, the routine proceeds to step S107 wherein the ECU 50 determines whether the restart conditions are met or not. If a YES answer is obtained, then the routine proceeds to step S108 wherein the ECU 50 (i.e., the start controller 55) controls the operation of the rotating electrical machine 14 to restart the engine 10. The routine then terminates to terminate the idle stop mode.

Alternatively, if a NO answer is obtained instep S107 meaning that the restart conditions are not met, then the routine proceeds to step S109 wherein the ECU 50 obtains the SOC of the lithium-ion battery 12 and determines whether the obtained SOC is higher than the SOC lower limit or not. If a YES answer is obtained, then the routine returns back to step S107. In other words, after elapse of a given period of time since a YES answer was obtained in step S109, the ECU 50 executes step S107 again. This causes the idle stop mode to continue to stop the engine 10 until the restart conditions are met or the SOC reaches the SOC lower limit.

Alternatively, if a NO answer is obtained in step S109 meaning that the obtained SOC is lower than the SOC lower limit, then the routine proceeds to step S108 wherein the ECU 50 controls the operation of the rotating electrical machine 14 to restart the engine 10. Specifically, the ECU 50 restarts the engine 10 regardless of the restart conditions and terminates the idle stop mode.

An electric power generating operation executed by the rotating electrical machine 14 according to a program in FIG. 3 will be described below. The program in FIG. 3 is executed cyclically by the ECU 50 (i.e., the power generation controller 56).

Figure 3:
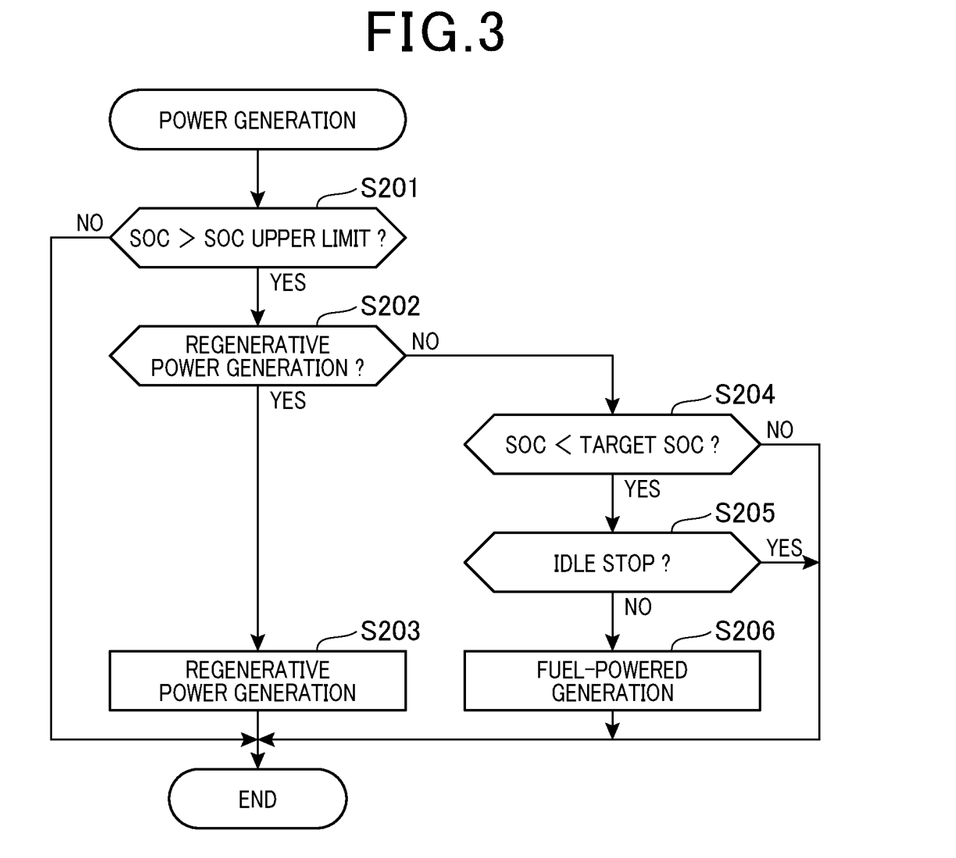
FIG. 3 is a flowchart of an electric power generation program executed by a control apparatus according to an embodiment.

After entering the program in FIG. 3, the routine proceeds to step S201 wherein the ECU 50 obtains the SOC of the lithium-ion battery 12 and determines whether the obtained SOC is lower than the upper limit of the available SOC range of the lithium-ion battery 12 or not.

If a NO answer is obtained in step S201, then the routine terminates the electric power generating operation. Alternatively, if a YES answer is obtained, then the routine proceeds to step S202 wherein the ECU 50 determines whether the regenerative power generation is permitted to be achieved using the kinetic energy of the vehicle or not. When determining that the accelerator of the vehicle is not actuated using the information about the speed of the vehicle and the driver's operation, that the brake is being actuated, or that the vehicle is decelerating, the ECU 50 decides that it is possible to achieve the regenerative power generation using the kinetic energy of the vehicle.

If a YES answer is obtained in step S202 meaning that it is possible to achieve the regenerative power generation using the kinetic energy of the vehicle, then the routine proceeds to step S203 wherein the ECU 50 controls the operation of the rotating electrical machine 14 to perform the regenerative power generation using the kinetic energy of the vehicle to charge the lithium-ion battery 12. The routine then terminates.

Alternatively, if a NO answer is obtained in step S202, the routine proceeds to step S204 wherein the ECU 50 determines whether the obtained SOC is lower than the target SOC or not. The ECU 50 may determine the target SOC using the idle stop enable SOC in step S204 or determine the target SOC concurrently with calculation of the idle stop enable SOC in step S103. If a NO answer is obtained in step S204, then the routine terminates the electric power generating operation. Alternatively, if a YES answer is obtained in step S204, then the routine proceeds to step S205 wherein it is determined whether the engine 10 is being stopped in the idle stop mode or not. If a YES answer is obtained, the ECU 50 terminates the electric power generating operation.

Alternatively, if a NO answer in step S205, then the routine proceeds to step S206 wherein the ECU 50 controls the operation of the engine 10 and rotates the rotating electrical machine 14 using torque produced by the output shaft of the engine 10 to make the rotating electrical machine 14 generate electricity in the power generation mode (i.e., the fuel-powered electrical generator mode). When the vehicle is accelerating, the ECU 50 operates the engine 10 so as to output a degree of torque large enough for the vehicle to continue to accelerate and for the rotating electrical machine 14 to generate electricity. Alternatively, when the vehicle is being stopped with the engine 10 idling, the ECU 50 then operates the engine 10 so as to generate a degree of torque only required for the rotating electrical machine 14 to generate electricity.

Figure 4:
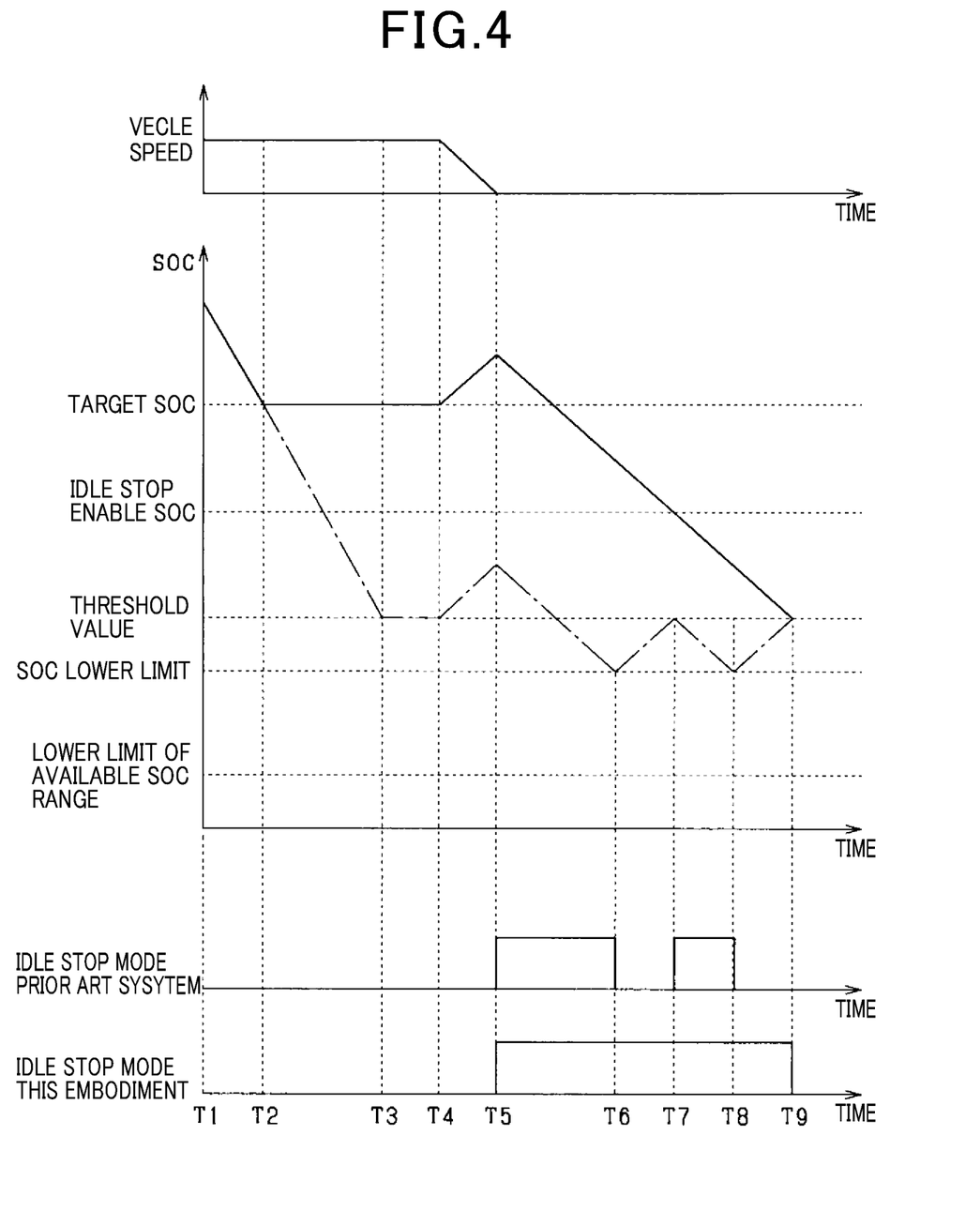
FIG. 4 is a time chart which demonstrates a change in a state of charge (SOC) of a storage battery installed in a control apparatus according to an embodiment.
Figure 5:
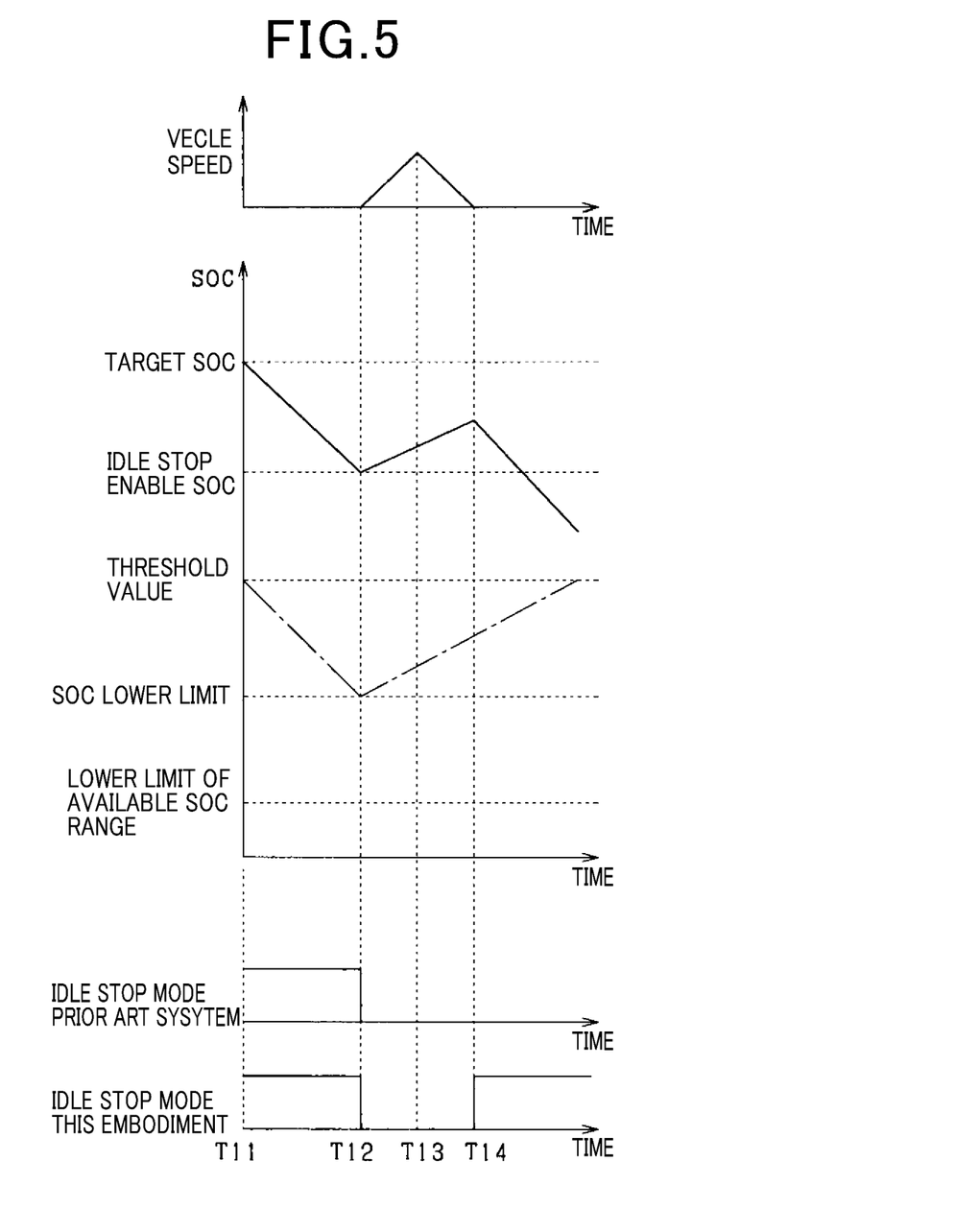
FIG. 5 is a time chart which demonstrates a change in a state of charge (SOC) of a storage battery installed in a control apparatus according to an embodiment.

A change in SOC of the lithium-ion battery 12 when the engine 10 is stopped in the idle stop mode will be described with reference to FIGS. 4 and 5. In FIGS. 4 and 5, a chain line indicates a change in SOC in a prior art system, while a solid line indicates a change in SOC in this embodiment. The prior art system determines the sum of the lower limit of the available SOC range of the lithium-ion battery 12 and a SOC required to compensate for an amount of electric power consumed by the electrical load 15 as a threshold value that is a minimum SOC of the lithium-ion battery 12 required to be stored in the lithium-ion battery 12 before the engine 10 is stopped in the idle stop mode. The following discussion will be made under conditions that the lower limit of the available SOC range of the lithium-ion battery 12 and the amount of electric power consumed by the electrical load 15 in this embodiment are identical with those in the prior art system. It is also assumed that the state of the lithium-ion battery 12 in this embodiment is identical with that in the prior art system, so that a minimum SOC (i.e., the SOC lower limit in this embodiment) required to restart the engine 10 is higher than the lower limit of the available SOC range, and that an initial value of the SOC in FIG. 4 in this embodiment is identical with that in the prior art system and higher than the target SOC.

First, the speed of the vehicle will be described with reference to FIG. 4. The vehicle travels at a constant speed between time T1 and time T4. The vehicle decelerates between time T4 and time T5 and then stops at time T5.

A change in SOC in the prior art system will be described below. When the vehicle travels at a constant speed between time T1 and time T3, the SOC is, as indicated by the chain line, higher than or equal to the threshold value, so that the rotating electrical machine 14 operates in the motor mode. The electrical load 15 consumes electric power. This causes the SOC to drop until the threshold value is reached.

When the vehicle decelerates between time T4 and time T5, the rotating electrical machine 14 operates in the regenerative power generation mode, so that the SOC rises above the threshold value. When the vehicle stops at time T5, the automatic stop conditions are met, so that the idle stop mode is entered to stop the engine 10.

When the vehicle is at rest between time T5 and time T6, the electrical load 15 continues to consume electric power during the idle stop mode, so that the SOC drops below the threshold value. When the SOC reaches the SOC lower limit that is a minimum SOC required to restart the engine 10 at time T6, the prior art system terminates the idle stop mode and then restarts the engine 10 although the restart conditions are not yet met in order to eliminate a risk of failure in restarting the engine 10. This stops the SOC from decreasing.

The engine 10 is placed in the idle mode between time T6 and time T7. The rotating electrical machine 14 generates electricity in the fuel-powered electrical generator mode, so that the SOC rises. Afterwards, when the SOC reaches the threshold value at time T7, the automatic stop conditions are met so that the idle stop mode is then entered.

The engine 10 is being stopped in the idle stop mode between time T7 and time T8, thus causing the SOC to decrease. When the SOC reaches the SOC lower limit that is a minimum SOC required to restart the engine 10 at time T8, the prior art system restarts the engine 10. This stops the SOC from decreasing. The engine 10 is placed in the idle mode between time T8 and time T9. The rotating electrical machine 14 generates electricity in the fuel-powered electrical generator mode, so that the SOC rises.

As apparent from the above discussion, in the prior art system, the SOC reaches the SOC lower limit that is a minimum SOC required to restart the engine 10 before the SOC decreases to the lower limit of the available SOC range depending upon the state of the lithium-ion battery 12. In other words, the prior art system starts to restart the engine 10 before an amount of electric power which is determined based on the lower limit of the available SOC range so as to compensate for an amount of electric power consumed by the electric load 15 and stored in the lithium-ion battery 12 is consumed fully. This results in a decrease in period of time for which the engine 10 is being stopped in the idle stop mode. This may lead to a risk that the engine 10 is restarted frequency depending upon the state of the lithium-ion battery 12.

Next, a change in SOC in the control apparatus in this embodiment will be described below with reference to FIG. 4. When the vehicle travels at a constant speed between time T1 and time T2, the SOC is, as indicated by the solid line, higher than or equal to the target SOC, so that the rotating electrical machine 14 operates in the motor mode. This causes the SOC to decrease to the target SOC. When the vehicle keeps traveling at a constant speed between time T2 and time T4, the SOC has already reached the target SOC, so that the rotating electrical machine 14 is stopped from operating in the motor mode. Since it is required to deliver electric power to the electrical load 15, the lead-acid storage battery 11 is used to supply electric power to the electrical load 15. This causes the SOC to be kept constant at the target SOC. The ECU 50 may actuate the rotating electrical machine 14 in the fuel-powered electrical generator mode to deliver electric power to the electrical load 15.

When the vehicle decelerates between time T4 and time T5, the rotating electrical machine 14 is actuated in the regenerative power generation mode, so that the SOC rises above the target SOC. When the vehicle is stopped at time T5, the automatic stop conditions are met, so that the idle stop mode is entered. When the vehicle is being stopped between time T5 and time T9 where the engine 10 is kept stopped in the idle stop mode, the electrical load 15 continues to consume the electric power, so that the SOC decreases.

As apparent from the above discussion, the idle stop enable SOC in this embodiment is selected to compensate for an amount of electric power consumed by the electrical load 15 based on the SOC lower limit at least required to restart the engine 10. This avoids an undesirable decrease in period of time for which the engine 10 is kept stopped in the idle stop mode regardless of a change in state of the lithium-ion battery 12, thereby minimizing a risk that the engine 10 is frequency restarted or the rotating electrical machine 14 is frequency actuated in the fuel-powered electrical generator mode. Typically, a large amount of energy is required to restart the engine 10. It is, thus, preferred that the number of times the engine 10 is restarted is small in terms of fuel economy. This embodiment enables the rotating electrical machine 14 to be operated in the motor mode for an increased period of time as compared with the prior art system, but it is advisable that the engine 10 be kept stopped in the idle stop mode for an increased period of time in terms of fuel economy.

Operations of the control apparatus in this embodiment and the prior art system will also be described with reference to FIG. 5. In the illustrated example, an initial value of the SOC is set to a required minimum value before the idle stop mode is entered when there is a period of time long enough to charge the lithium-ion battery 12 in each of this embodiment and the prior art system. In the following discussion, it is assumed that the initial value of the SOC in the prior art system is the threshold value, while the initial value of the SOC in this embodiment is the target SOC.

First, the state of the vehicle in the example of FIG. 5 will be described. The vehicle is being stopped between time T11 and time T12. The vehicle accelerates between time T12 and time T13. The vehicle decelerates between time T13 and time T14 and then stops at time T14.

Next, a change in SOC in the prior art system under the above situations will be described below.

When the vehicle is at rest at time T11, The SOC is identical with the threshold value, so that the idle stop mode is entered to stop the engine 10. When the vehicle is kept stopped between time T11 and time T12, the electrical load 15 is consuming electric power, so that the SOC decrease during the idle stop mode.

When the vehicle accelerates and then decelerates between time T12 and time T14, the SOC is kept below the threshold value, so that the rotating electrical machine 14 is actuated to generate electricity in the fuel-powered electrical generator mode and then in the regenerative power generation mode, thereby increasing the SOC. When the vehicle stops at time T14, the restart conditions are met, and the SOC is lower than the threshold value, the idle stop mode is inhibited from being entered.

Subsequently, a change in SOC in the control apparatus of this embodiment under the above situations will be described below.

When the vehicle is at rest at time T11, the SOC is higher than or equal to the idle stop enable SOC, so that the idle stop mode is entered. When the vehicle is kept stopped in the idle stop mode between the time T11 and time T12, the electrical load 15 continues to consume electric power, so that the SOC decreases.

When the vehicle accelerates and then decelerates between time T12 and time T14, the SOC is kept above the idle stop enable SOC, but below the target SOC, the rotating electrical machine 14 is actuated to generate electricity in the fuel-powered electrical generator mode and then in the regenerative power generation mode, thereby increasing the SOC. When the vehicle stops at time T14, the SOC is below the target SOC, but above the idle stop enable SOC, the idle stop mode is entered to stop the engine 10 when the restart conditions are met.

As apparent from the example in FIG. 5, when the restart conditions are met within a short period of time after the idle stop mode is terminated, it may result in a short period of time in which the electricity is generated, which leads to insufficient charging of the lithium-ion battery 12. In such a case, the prior art system is incapable of charging the lithium-ion battery 12 to increase the SOC above the threshold value, so that the idle stop mode is not entered. In contrast, the control apparatus in this embodiment has the target SOC to which the lithium-ion battery 12 is charged to be higher than the idle stop enable SOC. Accordingly, even when there is an insufficient period of time to charge the lithium-ion battery 12 after the idle stop mode is terminated, there is a high probability that the lithium-ion battery 12 still stores an amount of electric power sufficient to ensure the stability in operation of the electrical load 15. This ensures a chance to enter the idle stop mode even when the restart conditions are met within a short period of time after the idle stop mode is terminated.

The control apparatus in this embodiment offers the following beneficial advantages.

The idle stop enable SOC which permits the idle stop mode to be entered to stop the engine 10 is, as described above, set to the sum of the SOC lower limit and a SOC compensating for an amount of electric power expected to be consumed by the electrical load 15 during a stop of the engine 10 in the idle stop mode. Therefore, when the idle stop mode is entered when the SOC of the lithium-ion battery 12 is higher than or equal to the idle stop enable SOC, it minimizes a risk that the SOC decreases below the SOC lower limit during the stop of the engine 10 in the idle stop mode.

The SOC lower limit is, as described above, set to a minimum SOC of the lithium-ion battery 12 which is required to restart the engine 10 and determined depending upon the state of the lithium-ion battery 12 (e.g., the temperature or state of deterioration, or output ability of the lithium-ion battery 12). This ensures an amount of electric power required by the rotating electrical machine 14 to work as a starter to restart the engine 10 as long as the SOC of the lithium-ion battery 12 is higher than the SOC lower limit regardless of a change in state of the lithium-ion battery 12.

Consequently, the control apparatus in this embodiment minimizes a risk that the SOC in the lithium-ion battery 12 decreases below the SOC lower limit during the idle stop mode before the restart conditions are met, thereby causing the engine 10 to be restarted undesirably or resulting in a failure in restarting the engine 10. This enables a period of time for which the engine 10 is being stopped in the idle stop mode to be increased, thereby improving the fuel economy.

The automatic stop conditions may be satisfied within a short period of time after the engine 10 is restarted depending upon road conditions. Therefore, if the target SOC is selected to be identical with the idle stop enable SOC, it may result in an insufficient time to charge the lithium-ion battery 12 to increase the SOC thereof depending upon the road conditions. This results in a high probability of missing a chance to enter the idle stop mode to stop the engine 10.

In order to alleviate the above problem, the control apparatus in this embodiment is designed to set the target SOC higher than the idle stop enable SOC to have an amount of electric power in the lithium-ion battery 12 sufficient to ensure chances to stop the engine 10 in the idle stop mode even when there is an insufficient period of time to charge the lithium-ion battery 12 to restore the SOC. This improves the fuel economy.

The start controller 55 compares the SOC of the lithium-ion battery 12 with the SOC lower limit to determine whether the engine 10 should be restarted or not before the restart conditions are met. In other words, the ECU 50 restarts the engine 10 when the SOC of the lithium-ion battery 12 reaches the SOC lower limit even if the restart conditions are not yet satisfied. This eliminates a risk that the SOC decreases below the SOC lower limit during a stop of the engine 10 in the idle stop mode, which would make it impossible to restart the engine 10.

Usually, when the rotating electrical machine 14 is actuated in the fuel-powered electrical generator mode when the vehicle is accelerating or traveling at a constant speed, it will result in an increased consumption of fuel in the engine 10. The improvement of the consumption of fuel is, however, achieved by increasing a period of time in which the engine 10 is kept stopped in the idle stop mode even if the fuel is consumed to achieve the power-powered electrical generation. Therefore, the control apparatus in this embodiment is engineered to actuate the rotating electrical machine 14 in the fuel-powered electrical generator mode when the SOC of the lithium-ion battery 12 is lower than the target SOC even if the vehicle is not decelerating in order to increase the SOC above the target SOC. This results in an increased period of time for which the engine 10 is kept stopped in the idle stop mode, thereby improving the fuel economy.

Modifications

The control apparatus in the above embodiment may be modified in ways described below. In the following discussion, the same reference numbers as used in the above embodiment refer to the same or similar parts, and explanation thereof in detail will be omitted.

The consumed power calculator 52 may estimate the amount of electric power consumed by the electrical load 15 using a travel history of the vehicle. For instance, the travel history includes the frequency of entry of the idle stop mode to stop the engine 10 or the length of time the engine 10 is kept stopped in the idle stop mode. Use of the travel history enables the tendency of the frequency of entry of the idle stop mode or the length of time the engine 10 is kept in the idle stop mode to be derived which is associated with the consumed amount of electric power. The use of the travel history, therefore, results in enhanced accuracy in calculating the consumed amount of electric power.

Specifically, when determining that the frequency of entry of the idle stop mode is large, the consumed power calculator 52 may calculate the consumed amount of electric power to be larger than that when determining that the frequency of entry of the idle stop mode is relatively small. When determining that the length of time the engine 10 is kept in the idle stop mode is longer, the consumed power calculator 52 may calculate the consumed amount of electric power to be larger than that when determining that the length of time the engine 10 is kept in the idle stop mode is shorter. The enhanced accuracy in calculating the consumed amount of electric power enables a margin between the target SOC and the idle stop enable SOC to be decreased to decrease the value of the idle stop enable SOC, thereby facilitating entry of the idle stop mode to improve the fuel economy.

The SOC determiner 53 may be designed to correct the idle stop enable SOC using the travel history of the vehicle. For instance, when determining that the frequency of entry of the idle stop mode is smaller using the travel history, the SOC determiner 53 may calculate the idle stop enable SOC to be smaller than that when determining that the frequency of entry of the idle stop mode is larger. When determining that the length of time the engine 10 is kept in the idle stop mode is shorter, the SOC determiner 53 may calculate the idle stop enable SOC to be smaller than that when determining that the length of time the engine 10 is kept in the idle stop mode is longer. The use of the travel history enables a margin between the target SOC and the idle stop enable SOC to be decreased to decrease the value of the idle stop enable SOC, thereby facilitating entry of the idle stop mode to improve the fuel economy.

The consumed power calculator 52 may alternatively be engineered to estimate the amount of electric power consumed by the electrical load 15 using information about surroundings of the vehicle. For instance, such surrounding information includes a traffic congestion of the vehicle (i.e., the road is crowded or not), the width of the road, the number of lanes on the road, or the number of times the vehicle passes through traffic lights. The surrounding information may be derived using an in-vehicle camera or an in-vehicle communication system. When there is a traffic jam, the frequency of entry of the idle stop mode to stop the engine 10 is expected to be larger than that when the traffic is light. When the width of the road or the number of traffic lanes is larger, a period of time for which the traffic light indicates red instructing the driver to stop the vehicle is expected to be longer than that when the width of the road or the number of traffic lanes is smaller, thus resulting in an increase in period of time for which the engine 10 is kept stopped in the idle stop mode. When the number of times per unit time the vehicle passes through traffic lights is larger, the frequency of entry of the idle stop mode to stop the engine 10 is expected to be larger than that when the number of times per unit time the vehicle passes through traffic lights is smaller.

The consumed amount of electric power, as described already, depends upon the frequency of entry of the idle stop mode or the length of time the engine 10 is kept stopped in the idle stop mode. The consumed power calculator 52 may therefore be engineered to estimate the consumed amount of electric power using the obtained surrounding information. Specifically, when determining that the traffic is heavy using the surrounding information, the consumed power calculator 52 may calculate the consumed amount of electric power to be larger than that when determining that the traffic is light. When determining that the width of the road is larger, the consumed power calculator 52 may determine the consumed amount of electric power to be larger than that when determining that the width of the road is narrower. When determining that the number of traffic lanes is larger, the consumed power calculator 52 may calculate the consumed amount of electric power to be larger than that when determining that the number of traffic lanes is smaller. When determining that the number of times per unit time the vehicle passes through traffic lights is larger, the consumed power calculator 52 may calculate the consumed amount of electric power to be larger than that when determining that the number of times per unit time the vehicle passes through traffic lights is smaller.

The above ways improve the accuracy in estimating the consumed amount of electric power, thereby enabling a margin between the target SOC and the idle stop enable SOC to be decreased to decrease the value of the idle stop enable SOC, thereby facilitating entry of the idle stop mode to improve the fuel economy.

The SOC determiner 53 may correct the idle stop enable SOC using the surrounding information. For example, when determining that the traffic is heavy using the surrounding information, the SOC determiner 53 may correct the idle stop enable SOC to be larger than that when determining that the traffic is light. When determining that the width of the road is larger using the surrounding information, the SOC determiner 53 may correct the idle stop enable SOC to be larger than that when determining that the width of the road is smaller. When determining that the number of traffic lanes is larger using the surrounding information, the SOC determiner 53 may correct the idle stop enable SOC to be larger than that when determining that when determining that the number of traffic lanes is smaller. When determining that the number of times per unit time the vehicle passes through traffic lights is larger using the surrounding information, the SOC determiner 53 may correct the idle stop enable SOC to be larger than that when determining that the number of times per unit time the vehicle passes through traffic lights is smaller.

The SOC determiner 53 may be designed to increase the target SOC when it is determined using the travel history or the surrounding information that a time interval between start and stop of the vehicle tends is shorter than a given value. Specifically, the SOC determiner 53 calculates a time interval between when restart conditions have been met and when the automatic stop conditions have been met using the travel history and the surrounding information. When that time interval is determined to be relatively short, the SOC determiner 53 increase the target SOC. This enables an amount of electric power sufficient to restart the engine 10 to be kept in the lithium-ion battery 12 when the time interval between satisfaction of the restart conditions and satisfaction of the automatic stop conditions is too short to additionally charge an amount of electric power required to achieve a restart of the engine 10 in the lithium-ion battery 12. This minimizes a risk of missing a chance to enter the idle stop mode to stop the engine 10.

The SOC determiner 53 may alternatively be designed to determine the idle stop enable SOC and the target SOC when it is determined using the travel history or the surrounding information that a time interval between termination of stop of the engine 10 in the idle stop mode and subsequent satisfaction of the automatic stop conditions is short. The fact that the time interval between termination of stop of the engine 10 in the idle stop mode and subsequent satisfaction of the automatic stop conditions is short means that the frequency of entry of the idle stop mode to stop the engine 10 is large, there is a traffic jam, or the number of times the vehicle passes through traffic lights is large. The SOC determiner 53 may alternatively determine only the target SOC when determining using the travel history or the surrounding information that the time interval between termination of stop of the engine 10 in the idle stop mode and subsequent satisfaction of the automatic stop conditions is long. In this case, the target SOC is used instead of the idle stop enable SOC.

The above embodiment uses the rotating electrical machine 14 as an engine starter, but may alternatively be equipped with a separate engine starter instead of the rotating electrical machine 14.

The idle stop enable SOC may alternatively be determined only within a time interval between termination of the idle stop mode to stop the engine 10 and when the SOC of the lithium-ion battery 12 increases to be higher than or equal to the target SOC. In this case, after the SOC exceeds the target SOC, the target SOC is used instead of the idle stop enable SOC. This eliminates the need for storing the idle stop enable SOC in a memory and results in a decrease in load on calculation.

Figure 6:
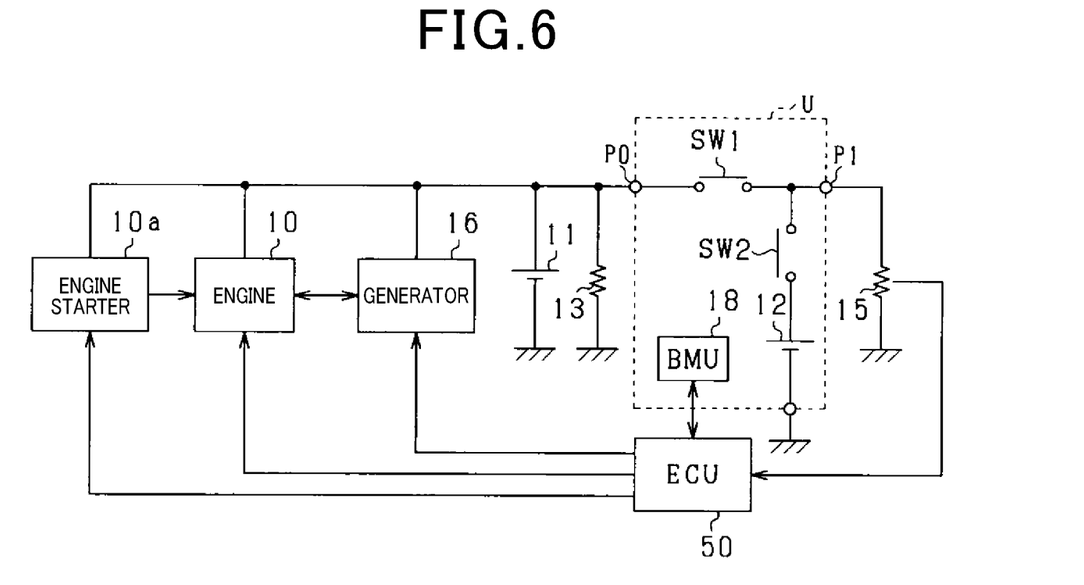
FIG. 6 is a schematic view which illustrates an in-vehicle power supply system in a first modified form of an embodiment.

The circuit structure in the above embodiment may be modified in the following ways. For instance, the control apparatus may be equipped with a double-switch circuit structure, as illustrated in FIG. 6. The engine starter 10a, the generator 16 (i.e., an alternator), the lead-acid storage battery 11, and the electrical load 13 are connected parallel to the external terminal P0 of the battery unit U. The engine starter 10a works to start the engine 10. The generator 16 is mechanically connected to and driven by the engine 10 and selectively works in the regenerative power generation mode and the fuel-powered electrical generator mode. The electrical load 15 is connected to the external terminal P0 of the battery unit U. The lead-acid storage battery 11 may be used to deliver electric power to the engine starter 10a to restart the engine 10. In this case, the SOC lower limit is determined based on a minimum SOC required to supply an amount of electric power to ensure the stability in operation of the electric load 15 connected to the lithium-ion battery 12.

Figure 7:
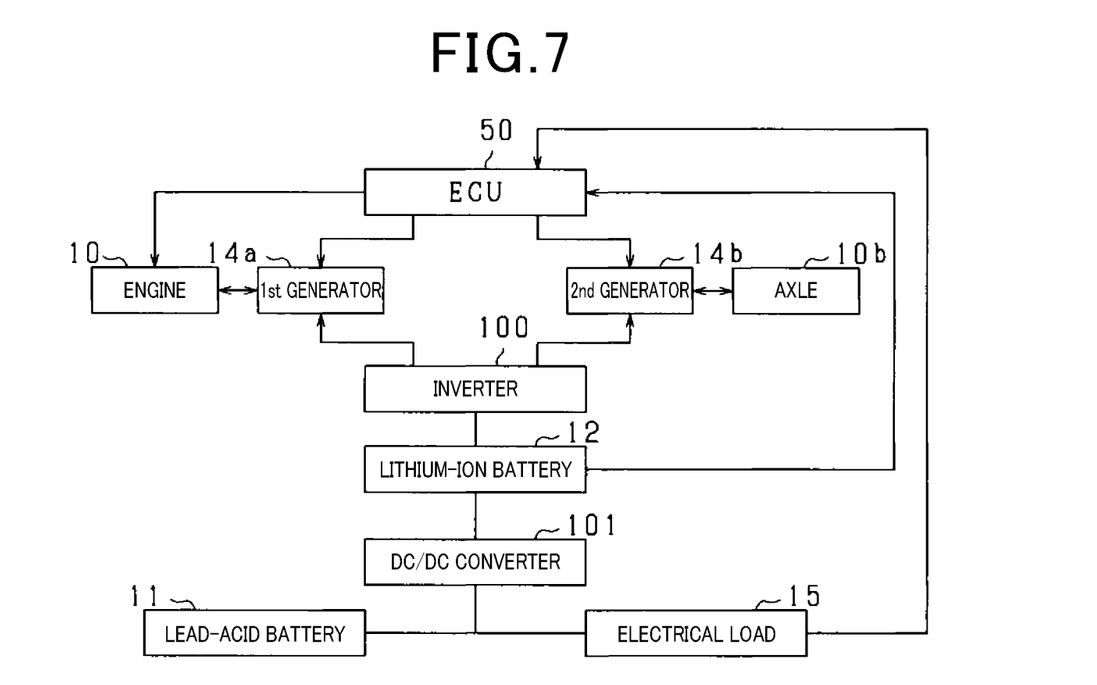
FIG. 7 is a schematic view which illustrates an in-vehicle power supply system in a second modified form of an embodiment.

The control apparatus may alternatively be, as illustrated in FIG. 7, equipped with two separate rotating electrical machines: the first rotating electrical machine 14a and the second rotating electrical machine 14b. The first rotating electrical machine 14a selectively works as an electrical generator and an engine starter to start the engine 10. The second rotating electrical machine 14b is connected to the axle 10b of the vehicle and works to move the vehicle. The lithium-ion battery 12 is connected to the first rotating electrical machine 14a and the second rotating electrical machine 14b through the inverter 100. The lithium-ion battery 12 is also connected to the lead-acid storage battery 11 through the DC/DC converter 101. The lithium-ion battery 12 is a high-voltage battery (e.g., 300V-battery) which is higher in output voltage than the lead-acid storage battery 11. Instead of the lithium-ion battery 12, another type of high-voltage battery may be used. Similarly, instead of the lead-acid storage battery 11, another type of low-voltage battery may be used.

The SOC lower limit is determined to be the higher of a minimum SOC required for the second rotating electrical machine 14b to restart the engine 10 and a minimum SOC required for the first rotating electrical machine 14a to move the vehicle.

In the above embodiment, the state of deterioration or temperature of the lithium-ion battery 12 is used as a parameter representing the state of the lithium-ion battery 12, but however, a combination of output voltage (or output current) and a SOC of the lithium-ion battery 12 may be used as indicating the state of the lithium-ion battery 12 associated with an output ability thereof. For instance, when an output voltage from the lithium-ion battery 12 is low for the SOC of the lithium-ion battery 12, the lithium-ion battery 12 may be determined to be deteriorated to increase the SOC lower limit.

In the above embodiment, when the SOC is lower than the SOC lower limit, the lead-acid storage battery 11 may deliver electric power to the rotating electrical machine 14 to restart the engine 10.

The rotating electrical machine 14, as described above, works to assist in moving the vehicle in the torque assist mode, but however, may alternatively be designed only to start the engine 10 without having the torque assist function.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. A control apparatus configured to be used in a vehicle having an internal combustion engine, a starter configured to start the internal combustion engine, a chargeable and dischargeable storage battery, and an electrical load which is configured to be supplied with electric power from the storage battery, comprising:
   a stop controller configured to stop the internal combustion engine in an idle stop mode when an automatic stop condition is met;
   a start controller configured to control an operation of the starter to restart the internal combustion engine when a restart condition is met during the idle stop mode;
   a lower limit calculator configured to calculate a SOC lower limit using a state of the storage battery, the SOC lower limit being a state of charge of the storage battery required to continue to stop the internal combustion engine in the idle stop mode;
   a consumed power calculator configured to calculate a consumed amount of electric power that is an amount of electric power expected to be consumed by the electrical load during a stop of the internal combustion engine in the idle stop mode; and
   a SOC determiner configured to determine an idle stop enable SOC that is a state of charge of the storage battery that permits the idle stop mode to be entered to stop the internal combustion engine, the idle stop enable SOC is the sum of the SOC lower limit and a SOC of the storage battery that is at least the consumed amount of electric power calculated by the consumed power calculator,
   wherein the control apparatus is configured such that the stop controller does not stop the internal combustion engine in the idle stop mode when the idle stop enable SOC is less than the state of charge of the storage battery.

2. A control apparatus as set forth in claim 1, wherein the lower limit calculator is configured such that the SOC lower limit is a function of a minimum value of state of charge of the storage battery required to restart the internal combustion engine.

3. A control apparatus as set forth in claim 1, wherein the lower limit calculator is configured such that the SOC lower limit is based on a minimum value of state of charge of the storage battery required to output an amount of electric power which ensures stability in operation of the electrical load during the idle stop mode.

4. A control apparatus as set forth in claim 1, wherein:
   the vehicle includes an electrical generator configured to generate electric power using drive energy from the internal combustion engine or kinetic energy of the vehicle;
   the storage battery is chargeable using the electric power from the electrical generator;
   the control apparatus includes power generation controller configured to control an operation of the electrical generator to bring a state of charge of the storage battery to be higher than or equal to a target state of charge; and
   the target state of charge is higher than the idle stop enable SOC.

5. A control apparatus as set forth in claim 4, wherein the power generation controller is configured such that, when a state of charge of the storage battery is lower than the target state of charge after termination of stop of the internal combustion engine in the idle stop mode, the power generation controller actuates the electrical generator to produce electric power using the drive energy from the internal combustion engine or the kinetic energy of the vehicle until the target state of charge is reached.

6. A control apparatus as set forth in claim 4, wherein the SOC determiner is configured such that the idle stop enable SOC is determined only within a time interval between stopping of the internal combustion engine in the idle stop mode and when a state of charge of the storage battery is increased to reach the target state of charge.

7. A control apparatus as set forth in claim 4, wherein the SOC determiner is configured such that the idle stop enable SOC is determined when it is determined using a travel history of the vehicle or information about surroundings of the vehicle that a time interval between termination of the idle stop mode and subsequent satisfaction of the automatic stop condition is shorter than a given value.

8. A control apparatus as set forth in claim 1, wherein the consumed power calculator is configured such that the consumed power calculator calculates the consumed amount of electric power based on a travel history of the vehicle.

9. A control apparatus as set forth in claim 8, wherein the consumed power calculator is configured such that, when determining based on the travel history that a frequency of entry of the idle stop mode is large or a length of time the internal combustion engine is kept stopped in the idle stop mode is long, the consumed power calculator calculates the consumed amount of electric power to be larger than that when determining that the frequency of entry of the idle stop mode is small or the length of time the internal combustion engine is kept stopped in the idle stop mode is short.

10. A control apparatus as set forth in claim 1, wherein the consumed power indicator is configured such that the consumed power calculator calculates the consumed amount of electric power based on information about surroundings of the vehicle.

11. A control apparatus as set forth in claim 10, wherein the consumed power indicator is configured such that, when determining based on the information about surroundings of the vehicle that there is a traffic jam, a width of a road is large, or the number of times the vehicle passes through traffic lights is large, the consumed power calculator calculates the consumed amount of electric power to be larger than that when determining based on the information about surroundings of the vehicle that the traffic is light, the width of the road is narrow, or the number of times the vehicle passes through traffic lights is small.

12. A control apparatus as set forth in claim 1, wherein the start controller is configured to restart the internal combustion engine based on comparison of a state of charge of the storage battery with the SOC lower limit before the restart condition is met.

* * * * *